United States Patent
O'Riorden et al.

(10) Patent No.: US 7,641,398 B2
(45) Date of Patent: Jan. 5, 2010

(54) SINGLE BOOT FOR DUPLEX FIBER OPTIC CONNECTORS

(76) Inventors: Stephen O'Riorden, 12 Davis Rd., Stow, MA (US) 01775; David Geldart, 354 Ridge St., Arlington, MA (US) 02474; Kenichiro Nakamura, 14370 Caminito Lazanja, San Diego, CA (US) 92127

( * ) Notice: Subject to any disclaimer, the term of this patent is extended or adjusted under 35 U.S.C. 154(b) by 67 days.

(21) Appl. No.: 12/048,740

(22) Filed: Mar. 14, 2008

(65) Prior Publication Data
US 2008/0226237 A1  Sep. 18, 2008

Related U.S. Application Data

(60) Provisional application No. 60/894,976, filed on Mar. 15, 2007.

(51) Int. Cl.
*G02B 6/36* (2006.01)
(52) U.S. Cl. ....................................................... 385/86
(58) Field of Classification Search ................... 385/53, 385/56, 58, 59, 76, 86, 89
See application file for complete search history.

(56) References Cited

U.S. PATENT DOCUMENTS

| 6,511,230 B1 * | 1/2003 | Connelly et al. ............... 385/58 |
| 7,325,980 B2 * | 2/2008 | Pepe ............................ 385/86 |
| 2004/0136657 A1 | 7/2004 | Ngo |
| 2006/0089049 A1 * | 4/2006 | Sedor ......................... 439/620 |
| 2006/0269194 A1 * | 11/2006 | Luther et al. .................. 385/78 |

FOREIGN PATENT DOCUMENTS

| DE | 202006011910 U1 | 3/2007 |
| DE | 102006019335 A1 | 10/2007 |
| EP | 1074868 A1 | 7/2001 |
| EP | 1566674 A1 | 8/2005 |
| WO | WO 0179904 A2 | 10/2001 |

* cited by examiner

*Primary Examiner*—Sarah Song
(74) *Attorney, Agent, or Firm*—Pepper Hamilton LLP

(57) ABSTRACT

An apparatus for holding a first fiber optic connector and a second fiber optic connector includes a housing configured to secure the first fiber optic connector and the second fiber optic connector at a first end and a strain relief boot connected to a second end of the housing. The housing and the strain relief boot are configured to form a passageway to receive a fiber optic cable that is connected to both the first fiber optic connector and the second fiber optic connector.

20 Claims, 5 Drawing Sheets

SINGLE BOOT FOR DUPLEX FIBER OPTIC CONNECTORS

RELATED APPLICATIONS

This application claims the benefit of priority to U.S. Provisional Application No. 60/894,976, filed Mar. 15, 2007 and entitled, "Single Boot for Duplex Fiber Optic Connectors," which is herein incorporated by reference in its entirety.

BACKGROUND

This application discloses an invention that is related, generally and in various embodiments, to an apparatus for use with a fiber optic retaining system. Fiber optic cable systems provide a large bandwidth capacity for the transmission of voice and data. In order to extend such systems closer and closer to the premises of the end subscribers, more and more fiber optic connections are required, which often necessitates duplex cable connectors. Such connections are typically made by highly skilled field personnel utilizing specialized tools and equipment.

A conventional way of pairing two connectors to accommodate increased transmission capacity requires many parts, and can make connection to an adapter a difficult task. Often, the connectors can rotate before connection to the adapters, which can cause damage to the hardware. Further, generally, a duplex LC connector includes two cables: one attached to each of the connectors, and these two connectors are held together by a clip. Multiple cables require multiple crimp rings, multiple heat shrink tubes, and multiple boots to attach. This can create a need for more space in order to secure attachment to fiber optic adapters.

SUMMARY OF THE INVENTION

In general, in an aspect, the invention is directed to an apparatus for holding a first fiber optic connector and a second fiber optic connector. The apparatus includes a housing configured to secure a first fiber optic connector and a second fiber optic connector at a first end and a strain relief boot connected to a second end of the housing, wherein the housing and the strain relief boot are configured to form a passageway to receive a fiber optic cable that is connected to the first fiber optic connector and the second fiber optic connector.

Aspects of the invention may include one or more of the following features. The apparatus can include a back post configured to secure the first fiber optic connector and the second fiber optic connector in a substantially fixed position. The back post can be configured to reside inside the housing. The housing and the back post can be integrally formed. The back post can include a first arcuate chamber to hold the first fiber optic connector and a second arcuate chamber to hold the second fiber optic connector. The apparatus can include a heat shrink tube configured to contain the fiber optic cable in the passageway. The apparatus can include a crimp ring configured to connect the heat shrink tube to the housing. The housing can include a thumb latch configured to release the first fiber optic connector and the second fiber optic connector.

In general, in another aspect, the invention is directed to a duplex fiber optic connector comprising a first fiber optic cable connector, a second fiber optic cable connector, a back post configured to secure the first fiber optic cable connector and the second fiber optic cable connector in a position adjacent one another, and a strain relief boot in connection with the back post and configured to receive a fiber optic cable that connects with the first and second fiber optic cable connectors.

Aspects of the invention may include one or more of the following features. The connector can include a housing configured to encapsulate the back post and connect with the strain relief boot. The connector can include a heat shrink tube configured to create a conduit within the strain relief boot to hold the fiber optic cable. The heat shrink tube can be connected to the back post via a crimp ring. The back post can include a first arcuate chamber to secure the first fiber optic connector and a second arcuate chamber to secure the second fiber optic connector.

The invention is directed to a connection system by which two fiber optic cable connectors are positioned together for connection to a duplex adapter. The invention includes a single back post, housing and a strain relief boot by which the fiber optic connectors are securely positioned in proximity to one another. The invention may exhibit one or more of the following capabilities. The housing and back post can improve the ease with which a duplex LC connector is received by a duplex LC adapter. For example, the back post can prevent rotation of the duplex LC connector before the connector is connected to the adapter. The invention can decrease the amount of space required for a duplex LC connector or other duplex connectors in order to achieve connection to an adapter.

DETAILED DESCRIPTION

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

The invention is directed to a connection system by which two fiber optic cable connectors are positioned together for connection to a duplex adapter. Embodiments of the invention include a single back post, housing and a strain relief boot by which the fiber optic connectors are positioned in proximity to one another. Embodiments of the invention can be used for connecting two LC style connectors side-by-side. Embodiments of the back post and housing of the invention can accommodate LC connectors that are available on the market without the need for substantial alterations to the LC connectors themselves. The invention can be used to connect two connectors other than LC connectors, such as SC connectors. Other embodiments of the invention are possible and envisioned.

Figure 1:
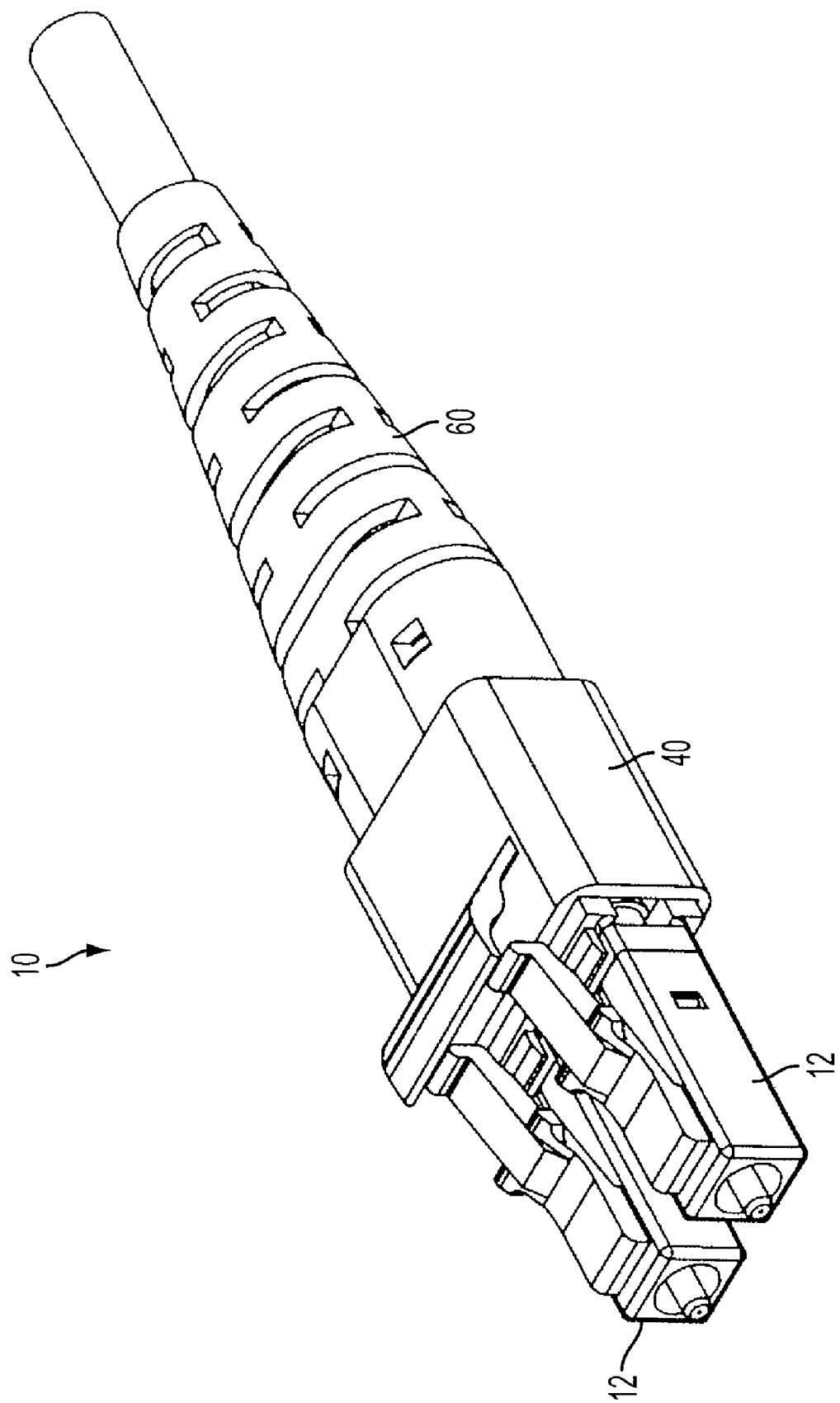
FIG. 1 is a duplex fiber optic cable connector and a strain relief boot and crimp ring with a heat shrink tube.
Figure 2:
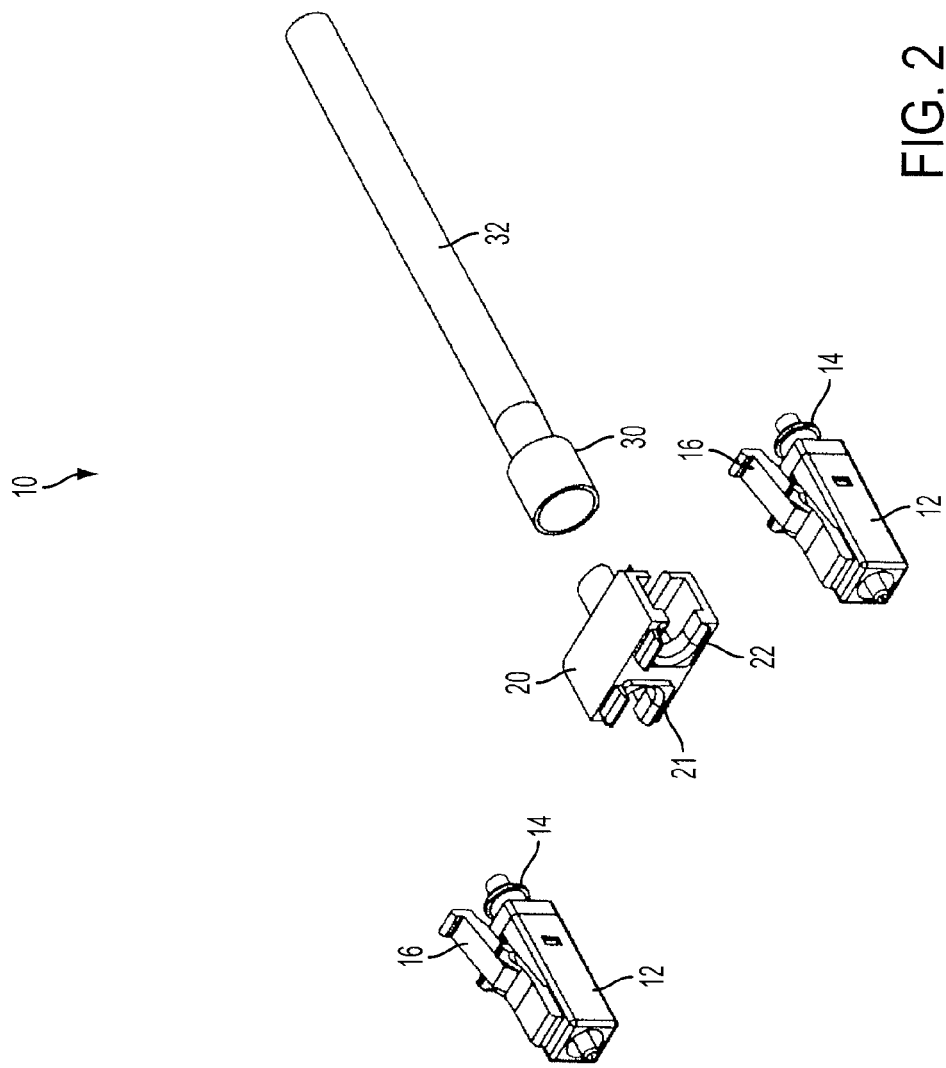
FIG. 2 is an assembly perspective view of a duplex fiber optic cable connector and the strain relief boot.

Referring to FIG. 1 and FIG. 2, a duplex fiber optic cable connector apparatus 10 includes LC connectors 12, a back post 20, a crimp ring 30, a shrink tube 32, a housing 40 and a strain relief boot 60. The LC connectors 12 are connected to be positioned side-by-side. The connectors 12 include a thumb latch 16. The fiber optic connectors 12 may be any suitable type of connector (e.g., SC, LC, MT, ST, etc.). The back post 20 is configured to accept the connectors 12. A first connector 12 is inserted into a first side 21 of the back post 20 and a second connector 12 is inserted into a second side 22 of the back post 20. The crimp ring 30 connects the back post 30 to the shrink tube 32. The shrink tube 32 is inserted through the housing 40 and the boot 60. The shrink tube extends through the distal end 62 of the boot 60. When assembled, as shown in FIG. 1, the back post 20 is positioned inside the housing 40. The connectors 12 extend outside of the housing 40 on an end opposite the position of the boot 60. The apparatus 10 may be fabricated from any suitable material. For example, according to various embodiments, the portions of the apparatus 10, such as the back post 20 and the housing 40, are fabricated from plastic (e.g., a thermoplastic).

Figure 3:
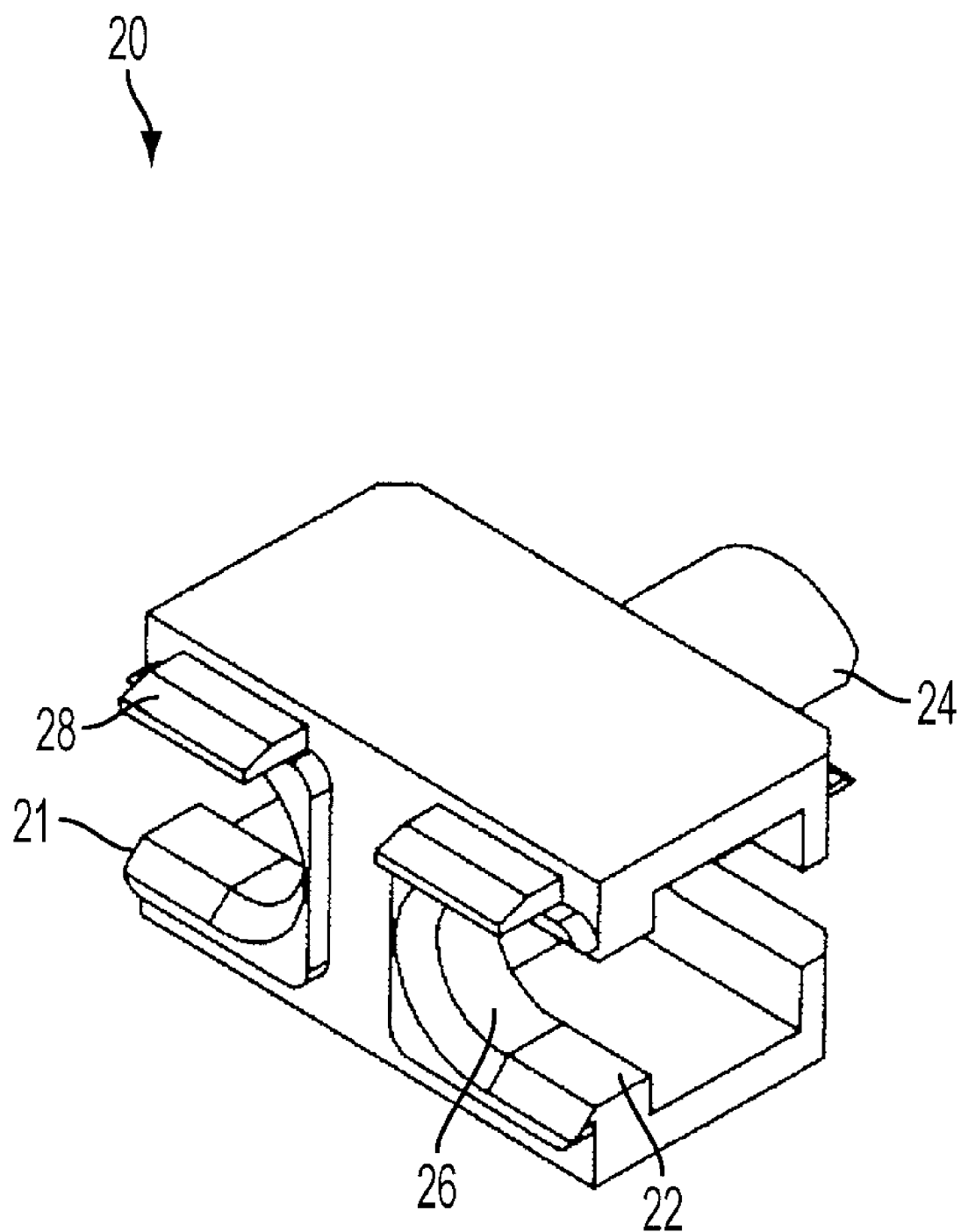
FIG. 3 is a perspective view of a duplex fiber optic cable connector back post.

Referring also to FIG. 3, the back post 20 includes an arcuate receptacle 26 on each of the sides 21 and 22. The back post 20 is substantially rectangular and is configured to receive the first LC connector 12 in a first arcuate opening 26 on the first side 21, and the second LC connector 12 in a second arcuate opening 26 on the second side 22. The connectors 12 are positioned to rest in the receptacle 26 such that the connectors 12 are substantially parallel to one another and contained within the back post 20 (i.e., such that the connectors 12 do not substantially extend outside of the sides 21, 22 of the back post 20). The connectors 12 are secured in the arcuate receptacles 26. The back post 20 secures the LC connectors 12 in a duplex configuration such that the LC connectors 12 are connected into LC duplex adapters. Preferably, the LC duplex adapters are industry standard adapters. The back post 20 includes a lip 28 configured above the top flat of the connector body. The lip 28 is configured to substantially prevent the connectors 12 from rotating before positioning in the connection system.

The back post 20 includes a cylindrical connection port 24. The port 24 is configured to connect to the crimp ring 30. For example, the port 24 forms a male connection with the crimp ring 30 and allows for passage of a fiber optic cable into the back post 20 for connection to the connectors 12. The crimp ring 30 is connected to the shrink tube 32. The shrink tube 32 is configured to provide a conduit, or passageway, through which the fiber optic cable passes to the connectors 12 for connection. A fiber optic cable is fastened to the back post 20, for example, using the crimp ring 30, although other fasteners are possible and envisioned.

Figure 4:
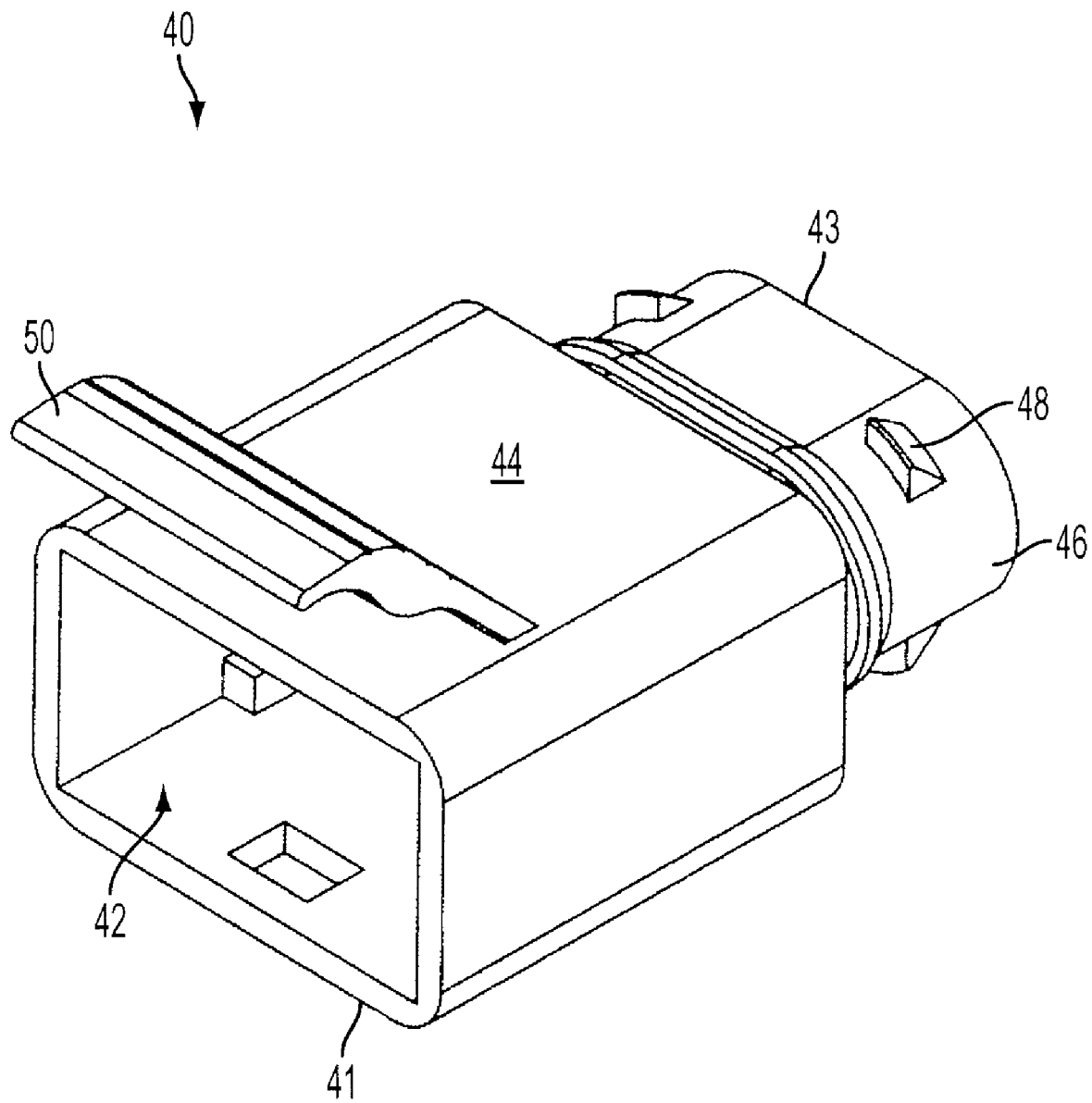
FIG. 4 is a perspective view of a duplex fiber optic cable connector housing.

Referring also to FIG. 4, the housing 40 comprises a first end 41 into which the back post 20 is inserted, and a second end 43 that connects to the boot 60. The housing 40 includes a body 44 having an opening 42, a duplex thumb latch 50, and a boot connector 46 having hooks 48. The thumb latch 50 is positioned on the housing 40 such that individual thumb latches 16 for each of the respective LC connectors 12 are triggered by a single thumb latch 50 on the housing 40. The duplex thumb latch 50 is configured to depress the thumb latch 16 of the first LC connector 12 and the thumb latch 16 of the second LC connector 12, preferably at substantially the same time. The thumb latch 50 is configured to improve the efficiency in connection between the duplex LC connectors 12 and adapters (not shown). The LC connectors 12 and back post 20 are secured into the housing 40. The back post 20 is substantially encapsulated within the housing 40.

Figure 5:
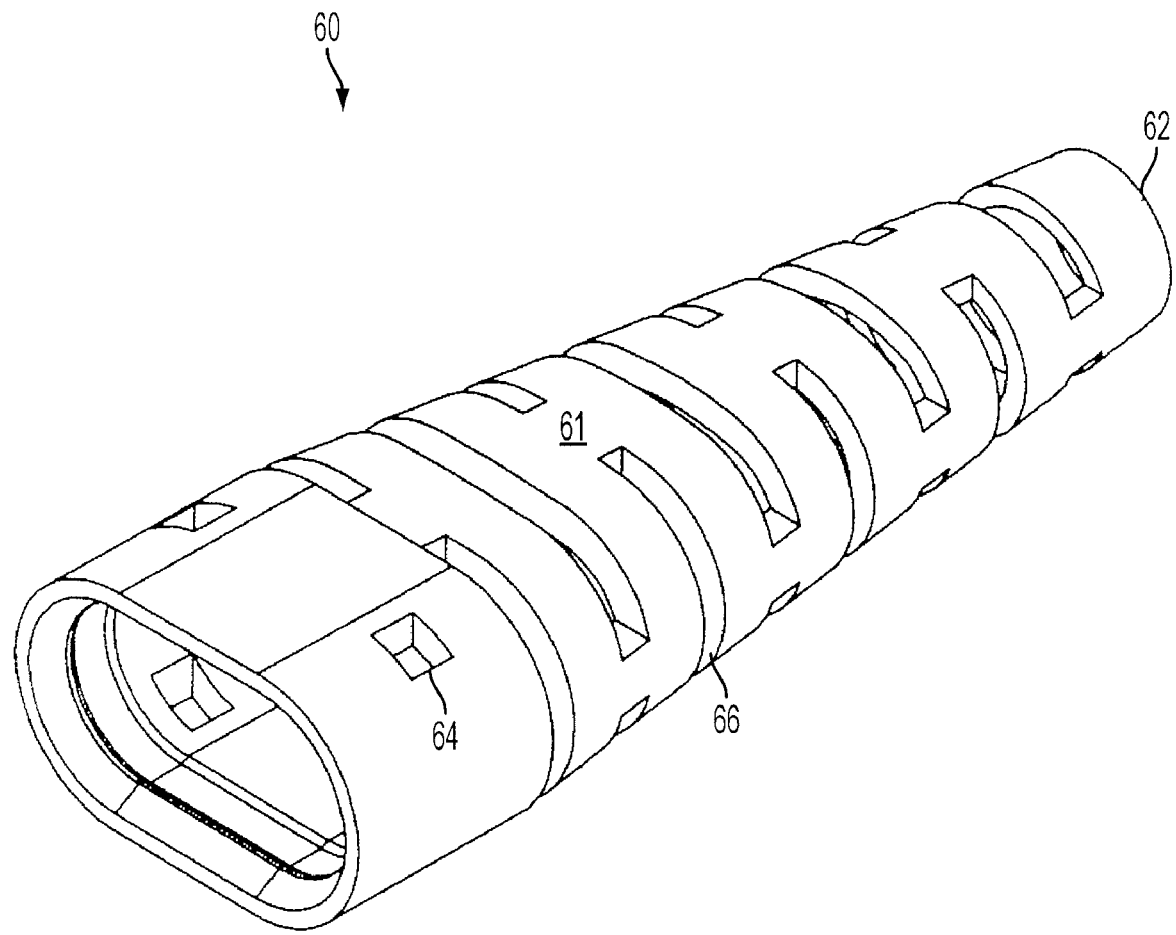
FIG. 5 is a perspective view of a strain relief boot for a duplex fiber optic cable connector.

Referring also to FIG. 5, the strain relief boot 60 is affixed to the housing 40 on an end opposite to the position of the back post 20. The strain relief boot 60 is configured to reduce strain upon the cable inserted into the LC connectors 12. The strain relief boot 60 includes a tapered body 61. The body 61 includes slots 66 and snap holes 64. The snap holes 64 are configured to accept the hooks 48 of the housing 40 such that the housing is secured into position with the boot 60. The slots 66 are positioned along the length of the body 61 and provide flexibility to the boot 60.

The connection system of the duplex connector apparatus 10 operates to couple a fiber optic cable LC connector 12 with a second fiber optic cable LC connector 12 using the single housing 40, the back post 20 and the strain relief boot 60. In general, standard fiber optic connectors 12, such as LC connectors 12 are secured together side-by-side in a duplex configuration. The back post 20 and the housing 40 are configured to secure the connectors 12 in position for efficient connection to an adapter. The boot 60 is configured to secure the fiber optic cables in position such that the cables are not kinked or crimped. The apparatus 10 is configured to improve the ease with which the connectors 12 are connected to an adapter. The apparatus 10 is configured to allow for the reduction of two fiber optic cables to a single cable method. The single cable method used in the apparatus 10 is configured to increase the efficiency in assembling the connector by reducing the parts required for the connection system. The back post 20 and the housing 40 can be comprised of an integrated part. The heat shrink tube 32 and the boot 60 can be comprised of an integrated part.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An apparatus for securing a first fiber optic connector and a second fiber optic connector, comprising:
   a back post, having a first chamber for receiving a first fiber optic connector, and a second chamber for receiving a second fiber optic connector, said first and second chambers adapted and arranged to receive and hold said first and said second fiber optic connectors, respectively;
   said back post further providing structure for preventing unwanted rotation of said first and second fiber optic connectors within said first and second chambers of the back post;
   a housing that houses at least a portion of said back post and providing a conduit for a fiber optic cable through said housing, said housing further comprising a thumb latch arranged and configured to activate a latch in each of said first and second fiber optic connectors substantially at the same time.

2. The apparatus of claim 1, further comprising a strain relief boot, coupled to said housing, and though which a fiber optic cable may be passed.

3. The apparatus of claim 1, said first and second chambers comprising first and second arcuate chambers sized and shaped to mechanically mate to a pair of corresponding fiber optic connectors of the type available on the market, without modification to said connectors.

4. The apparatus of claim 3, said first and second chambers comprising first and second arcuate chambers sized and shaped to mechanically mate to a pair of corresponding standard LC fiber optic connectors.

5. The apparatus of claim 3, said first and second chambers comprising first and second arcuate chambers sized and shaped to mechanically mate to a pair of corresponding standard SC fiber optic connectors.

6. The apparatus of claim 1, further comprising a heat shrinkable sleeve coupled to said housing to securely hold a fiber optic cable passing through said sleeve.

7. The apparatus of claim 6, said housing comprising a cylindrical connection port for coupling said housing to said heat shrinkable sleeve.

8. The apparatus of claim 1, said housing and said back post being integrally formed with one another as a unitary component of said apparatus.

9. An apparatus for securing a first fiber optic connector and a second fiber optic connector, comprising:
- a back post and housing, integrally formed with one another, to provide a conduit through said housing for passage of a fiber optic cable through said housing and into said back post;
- said back post being configured and arranged to receive and securely couple to a pair of fiber optic connectors of a type available in the market without modification to said connectors;
- said back post comprising a first end through which said pair of connectors protrude; and
- said housing comprising a second end through which a fiber optic cable can be received for coupling to said pair of fiber optic connectors in a duplex configuration,
- wherein said housing further comprising a thumb latch configured to activate a latch in each of said first and second fiber optic connectors substantially at the same time.

10. The apparatus of claim 9, further comprising a strain relief boot, coupled to said housing, and through which a fiber optic cable may be passed.

11. The apparatus of claim 9, said housing comprising first and second chambers sized and shaped to mechanically mate to a pair of corresponding fiber optic connectors of the type available on the market, without modification to said connectors.

12. The apparatus of claim 11, said first and second chambers comprising first and second arcuate chambers sized and shaped to mechanically mate to a pair of corresponding standard LC fiber optic connectors.

13. The apparatus of claim 11, said first and second chambers comprising first and second arcuate chambers sized and shaped to mechanically mate to a pair of corresponding standard SC fiber optic connectors.

14. The apparatus of claim 11, said back post comprising structure for preventing unwanted rotation of fiber optic connectors with respect to said first and second chambers.

15. The apparatus of claim 14, said structure for preventing unwanted rotation comprising a flattened portion proximate to said chambers, which mechanically prevents rotation of said connectors once inserted into said chambers.

16. The apparatus of claim 11, said chambers comprising a substantially rectangular cross section for receiving and securing fiber optic connectors having a corresponding substantially rectangular cross sectional body.

17. The apparatus of claim 9, further comprising a heat shrinkable sleeve coupled to said housing to securely hold a fiber optic cable passing through said sleeve.

18. The apparatus of claim 17, said housing comprising a cylindrical connection port for coupling said housing to said heat shrinkable sleeve.

19. The apparatus of claim 1, said structure for preventing unwanted rotation of said connectors comprising a flattened portion proximate to said chambers, which mechanically prevents rotation of said connectors once inserted into said chambers.

20. The apparatus of claim 1, said chambers comprising a substantially rectangular cross section for receiving and securing fiber optic connectors having a corresponding substantially rectangular cross sectional body.

* * * * *